Oct. 30, 1945.  R. C. SHOEMAKER  2,388,015
VEHICLE LOADER
Filed Feb. 4, 1944  6 Sheets-Sheet 1

Inventor:
Robert C. Shoemaker,
By McCabb, Hendt & Dickinson
Attorneys.

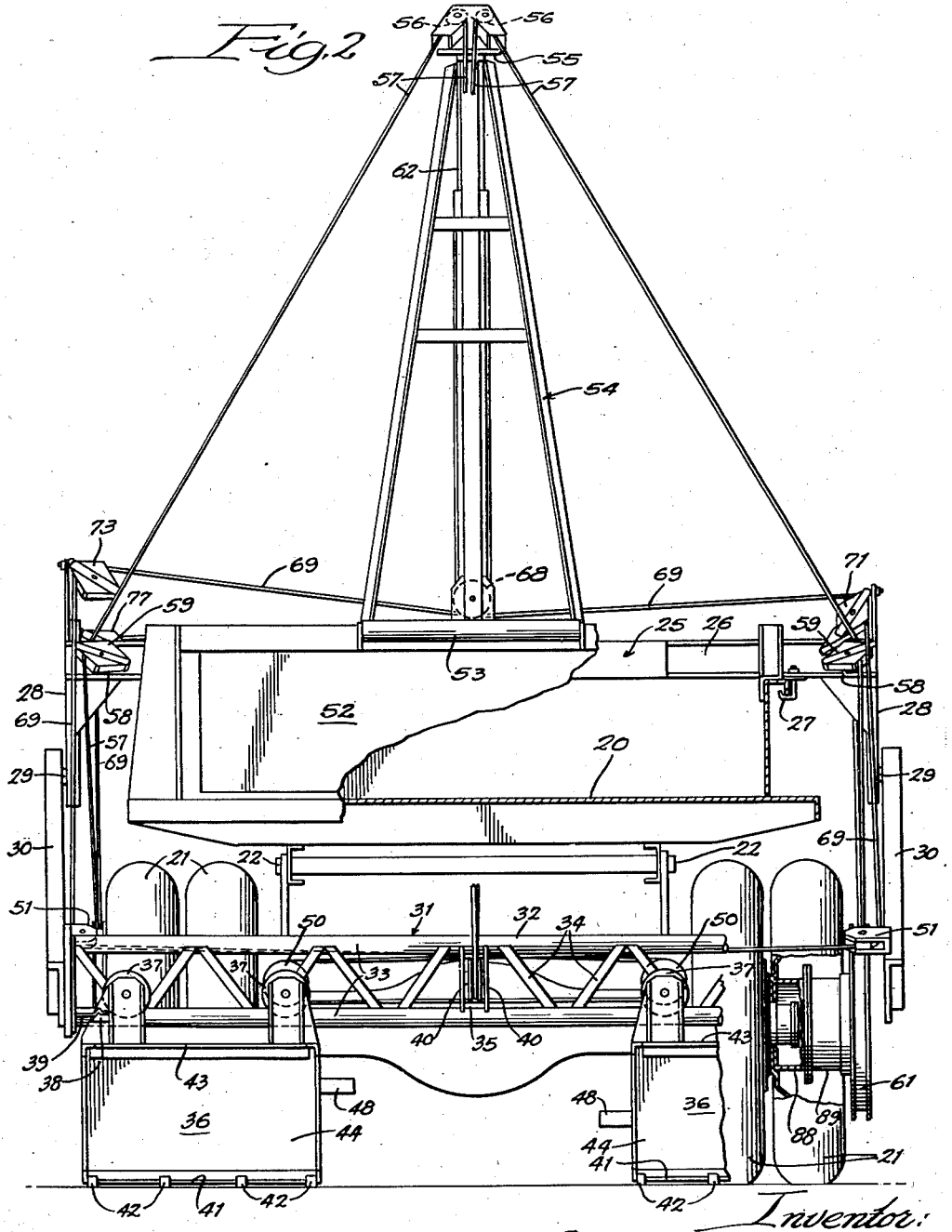

Oct. 30, 1945.  R. C. SHOEMAKER  2,388,015
VEHICLE LOADER
Filed Feb. 4, 1944  6 Sheets-Sheet 3
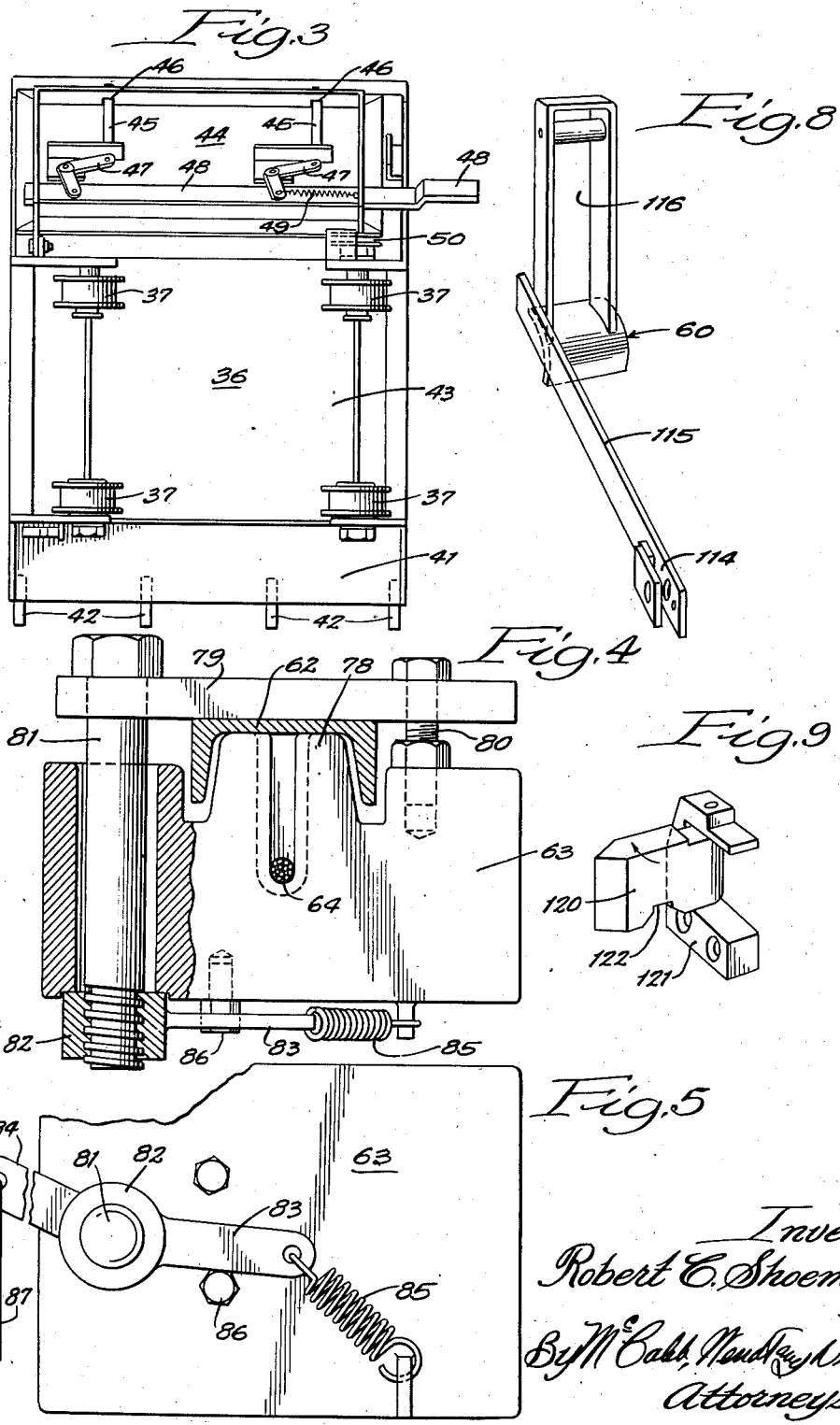

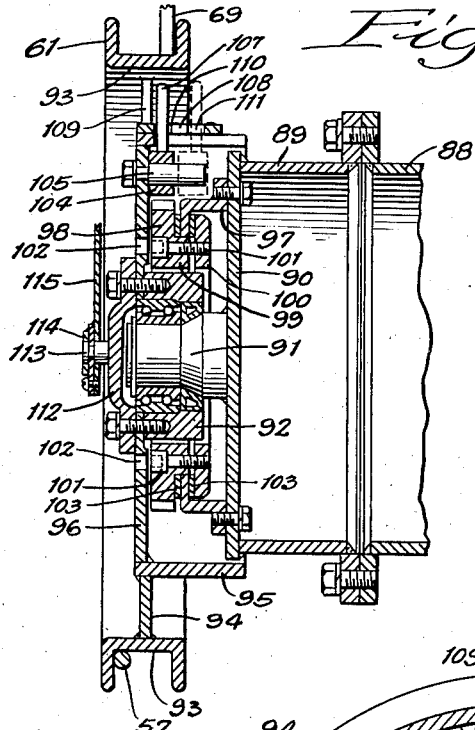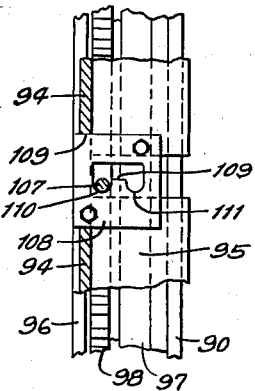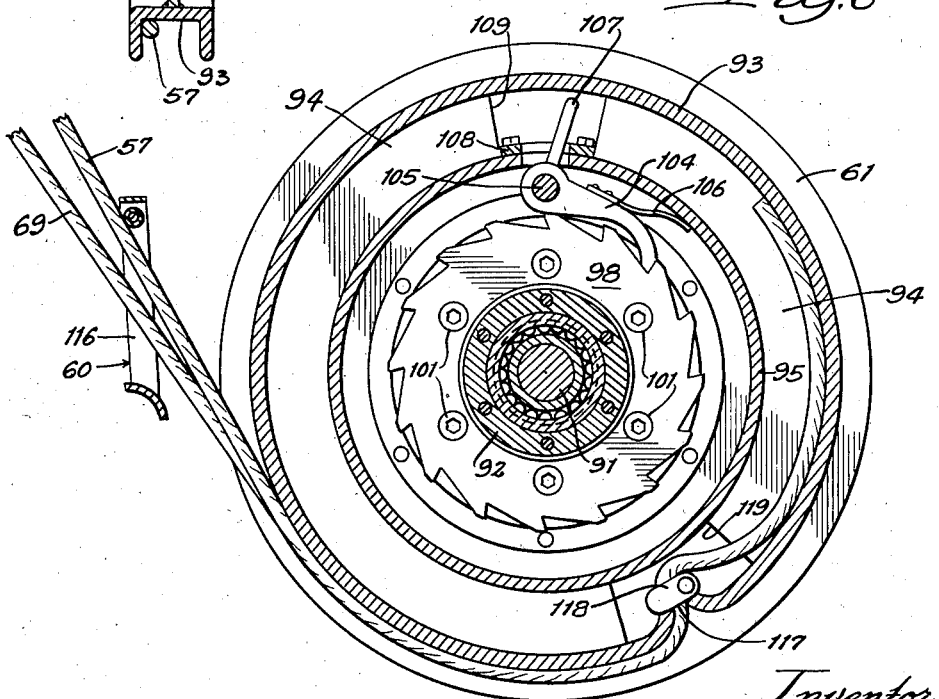

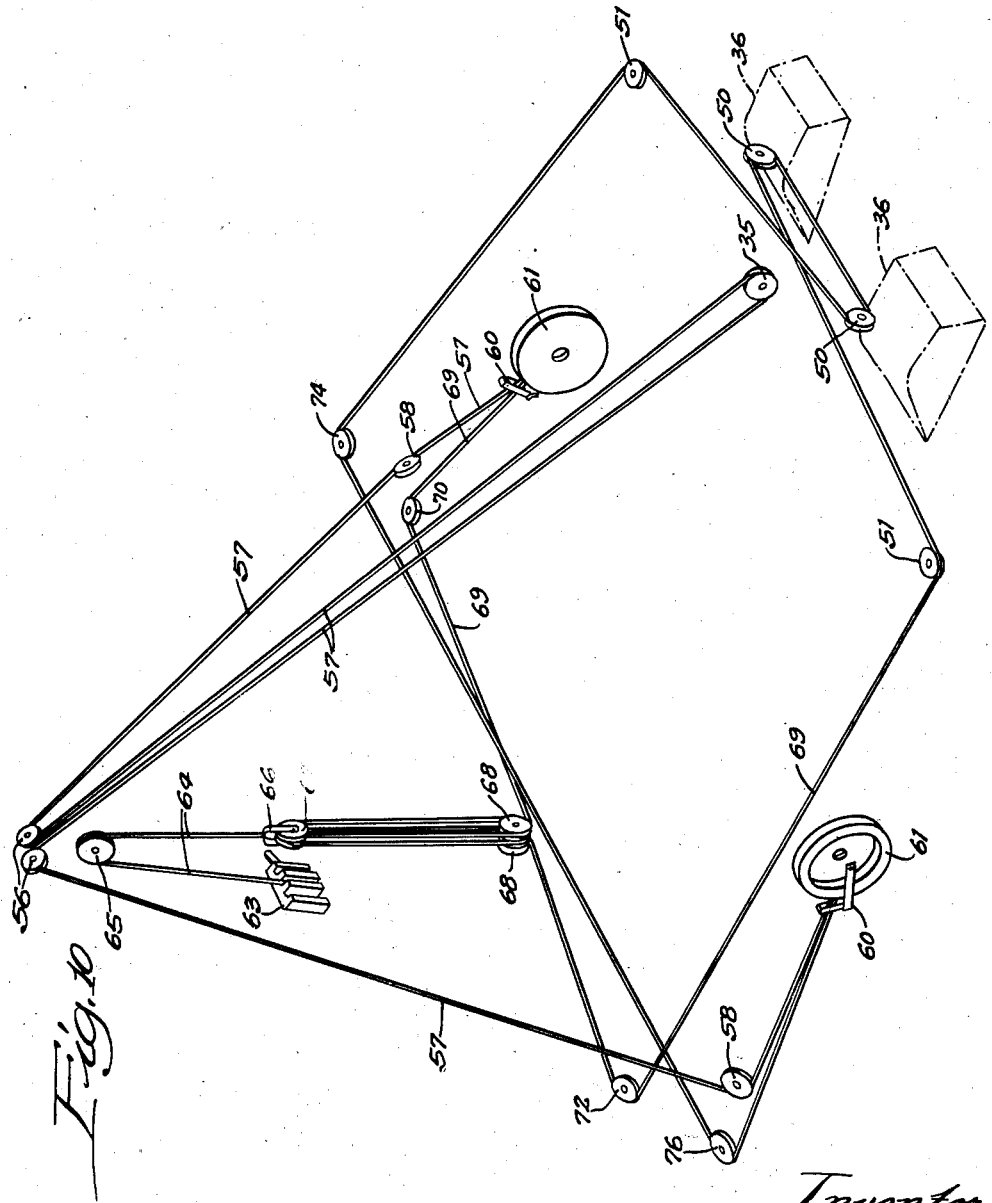

Oct. 30, 1945. R. C. SHOEMAKER 2,388,015
VEHICLE LOADER
Filed Feb. 4, 1944 6 Sheets-Sheet 6
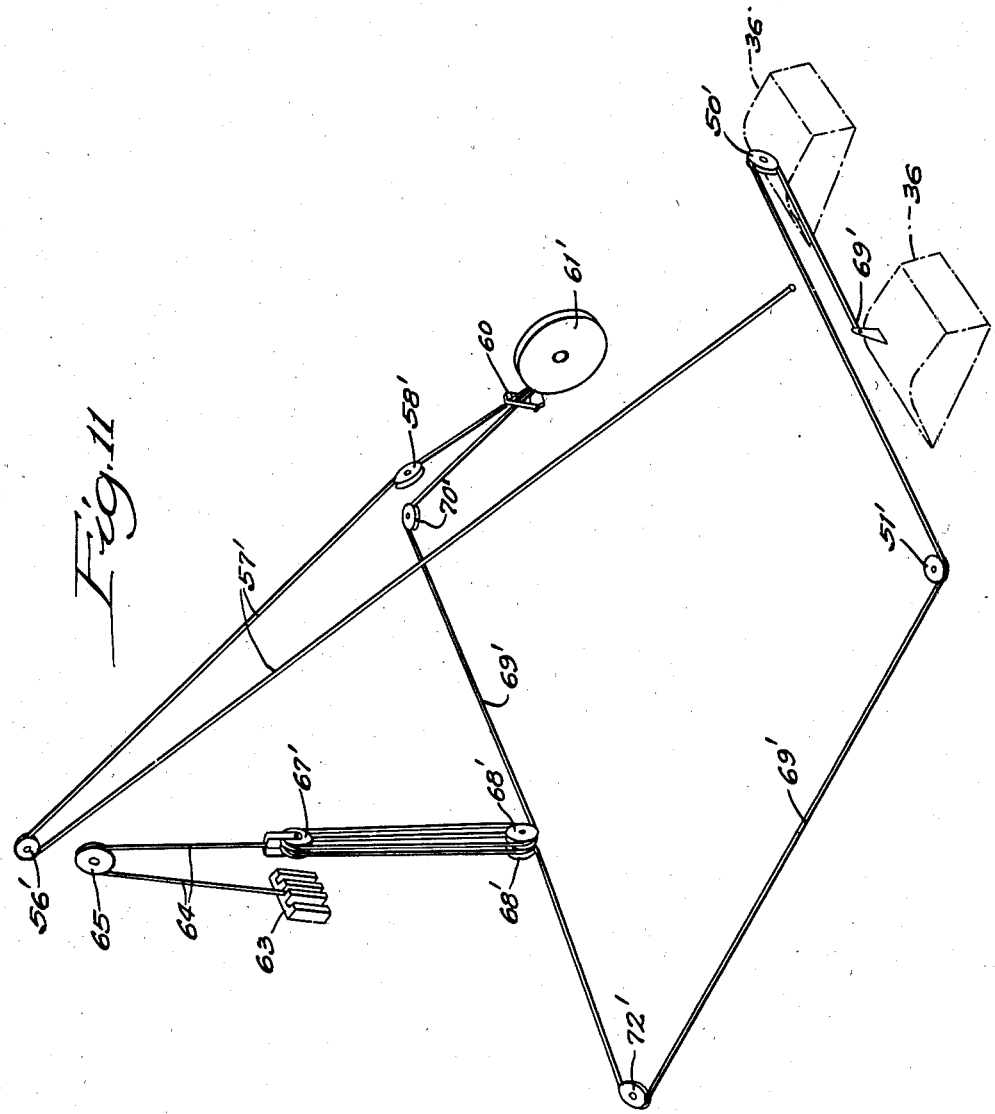
Inventor:
Robert C. Shoemaker,
By McCabb, Newbury Dickinson
Attorneys.

Patented Oct. 30, 1945

2,388,015

UNITED STATES PATENT OFFICE 2,388,015

VEHICLE LOADER

Robert C. Shoemaker, Portland, Oreg., assignor to Willamette Hyster Company, Portland, Oreg., a corporation of Oregon Application February 4, 1944, Serial No. 521,029

25 Claims. (Cl. 214—81)

This invention relates to vehicle loaders and particularly to loader equipment which may be mounted on a vehicle such as a truck for the purpose of equipping the vehicle with a loader arranged to be operated by the power unit of the vehicle or by the movement of the vehicle.

One of the objects of the invention is to provide a loader arranged to operate at the rear end of a truck to pick up a load behind the truck and to transfer the load to the body of the truck.

A further object of the invention is to provide such a loader arranged to pick up a load at a plurality of positions behind the truck located in the transverse direction of the truck.

A further object of the invention is to provide a loader arranged to be operated through the differential of a truck.

A further object of the invention is to provide a loader operable from the rear wheels of a truck and arranged to enhance the traction of the truck wheels during the loading operation.

A further object of the invention is to provide an improved loader operated by drums associated with both differential driven wheels whereby the loader may be operated notwithstanding slippage of one of the wheels.

A further object of the invention is to provide an improved differential dual-drum structure.

A further object of the invention is to provide an improved loader and improved means for controlling the dumping of the load into the body of a vehicle.

A further object of the invention is to provide an improved loader for a truck and provided with means for picking up load immediately behind the wheels and picking up load behind the vehicle and between the wheels.

Other objects, advantages and capabilities of the invention will appear from the following description of a preferred embodiment thereof taken in conjunction with the accompanying drawings in which:

Fig. 2 is a rear elevation thereof;

Fig. 3 is a plan view of one of the loader buckets;

Fig. 4 is a plan view partly in section, showing the manner in which the counterpoise is mounted;

Fig. 5 is a front elevation of the counterpoise;

Fig. 6 is a longitudinal sectional view through the drum, showing the interior structure thereof;

Fig. 7 is a transverse section through the drum;

Figure 1:
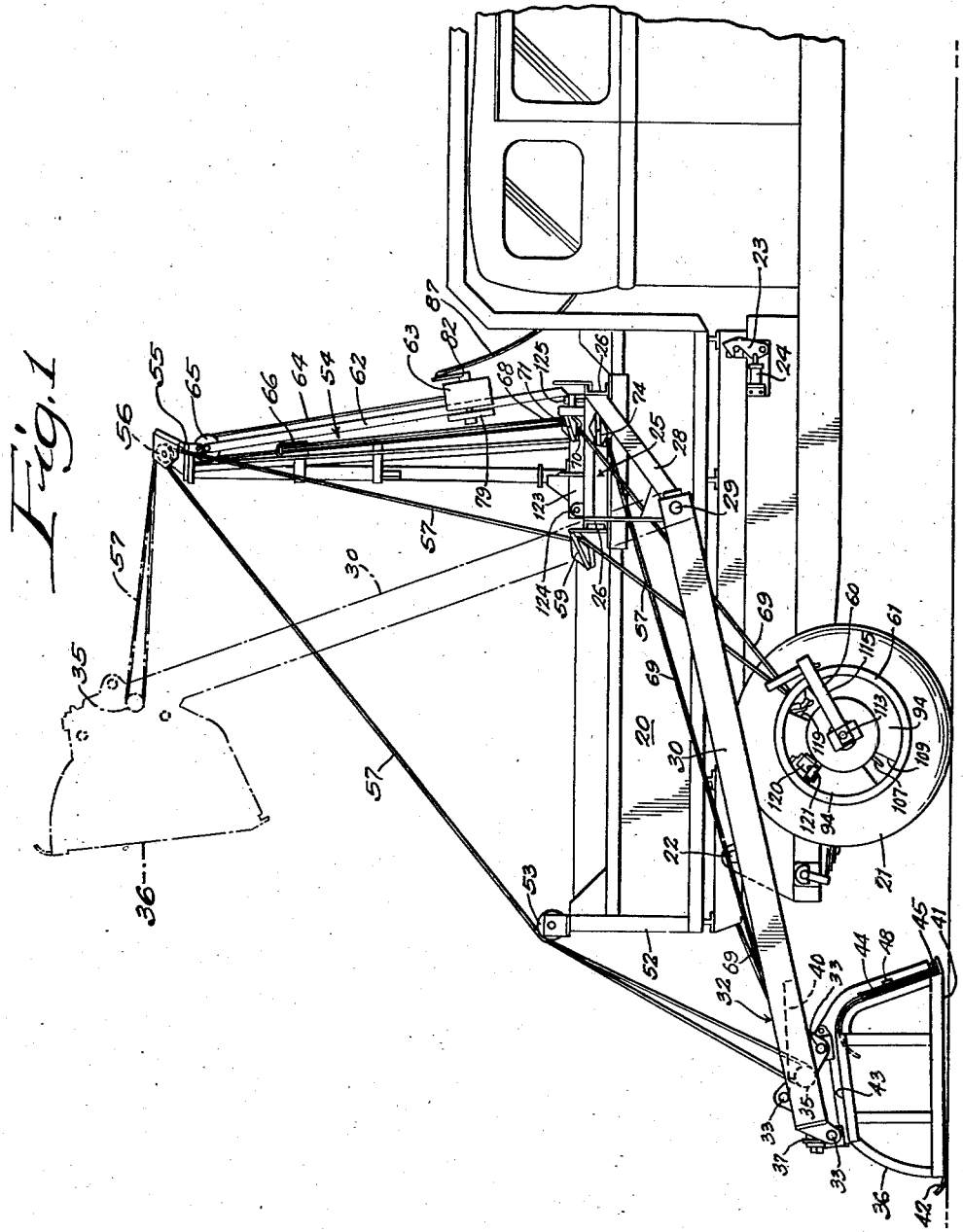
Figure 1 is a side elevation showing a truck provided with my improved loader.

Fig. 7—A is a plan detailed view of the dog handle and associated plate;

Fig. 8 is a perspective view showing the structure of the cable guide;

Fig. 9 is a perspective view showing the structure of the cable guide lock;

Fig. 10 is a perspective reaving diagram; and

Fig. 11 is a perspective reaving diagram of a single-drum embodiment of the invention.

Referring to the drawings, the reference numeral 20 indicates the body of a conventional dump truck the driving wheels of which are indicated by the numeral 21. The dump truck is pivotally mounted at 22. The truck may be provided with the usual hydraulic hoist (not shown) to effect elevation of the body 20 for rear dumping of the load.

To prevent any tendency of the body 20 to elevate during the operation of the loader, I prefer to provide latches 23 which normally connect the forward end of the body to the chassis. These latches are preferably actuated by hydraulic cylinders 24 which are connected to the hydraulic hoist. The latches respond to much less pressure than does the hoist when pressure begins to build up in the hydraulic system, and the first effect is to open the latches 23.

Across the forward end of the body 20 I locate a suitable framework 25 consisting primarily of longitudinal channels 26 and transverse members connected thereto. The frame 25 is removably secured to the body 20, for example by means of J bolts 27 which are arranged to cooperate with the flange on the upper edge of the side of the body 20. The frame 25 projects beyond the ends of the body and at its ends it is provided with downwardly extending fabricated brackets 28. The brackets 28 carry projecting trunnions 29 upon which are pivotally mounted the longitudinal arms 30 of a U-shaped boom 31, the rear ends of the arms 30 being connected by a transverse framework 32. The framework 32 comprises three longitudinal tubular members 33 which are connected together by suitable braces 34. At the center of the framework 32 is mounted a sheave 35 which lies in the longitudinal medial plane of the truck.

Upon the transverse framework 32 I mount two buckets or scoops 36 which are mounted for transverse movement along the framework. The scoops are provided with two pairs of rollers 37 which are arranged to roll along the two lowermost tubular members 33. Each bucket 36 is provided with an outwardly projecting latch member 38 which is adapted to engage a complementary resilient latch member 39. These latch members 39 are arranged at each end of the framework 32 so that when the buckets 36 are moved to the ends of the framework 32, they are held in such position until they are forcibly moved inwardly in the manner hereinafter described. When the buckets 36 are thus moved inwardly, they engage the plates 40 upon which the sheave 35 is mounted and consequently in their inward position the buckets 36 are located close together one on each side of the medial plane of the truck.

The rear or upper side of the bucket 36 is open. The lower wall 41 of the bucket is flat and is provided with runners 42 which are arranged to slide upon the ground when the snow or other material is being loaded into the bucket through the open end. The upper wall 43 of the bucket preferably slopes upwardly away from the open end so as to minimize the tendency of the snow to pack tight within the bucket. Each bucket is provided with a gate 44 which is pivotally mounted adjacent the end of the wall 43 and is provided with latches 45 which are arranged to enter openings 46 in the end portion of the wall 41. The gate 44 is curved adjacent its pivoted end and the pivotal axis of the gate is correlated with this curved portion of the gate so that the upper edge of the gate tends to move inwardly into the space occupied by the snow or other load when the gate opens, thereby imparting a "kick" to the load which aids in the dumping of the load from the bucket.

The latches 45 are pivotally mounted to bell crank levers 47 which are pivotally mounted on the gate. The other ends of the bell crank levers are pivotally connected to a bar 48 which is slidably mounted on the gate for movement in the transverse direction of the truck. The bar 48 of each bucket projects beyond the bucket towards the other bucket, and it is arranged to engage a vertical rib on the other gate 44 when the buckets are drawn together. The bars 48 of the two buckets are at different heights as shown in Fig. 2 so that they do not collide.

The bars 48 are biased toward latching position by springs 49 connected to the bars and to the gates. It will readily be understood that when the buckets are in their lower loading position and the buckets are slightly separated, the latches 45 are projected by the springs 49 into the openings 46 so that the gates are held closed until the buckets are again drawn together and the latches 45 are elevated out of the openings 46 whereupon the gates are again free to open. On each bucket is mounted a sheave 50 which lies in a plane parallel to the longitudinal direction of the frame 32, these sheaves being in the same plane. At each side of the yoke 31 and adjacent the ends of the framework 32 I provide two sheaves 51 which are so located as to guide a cable on to the sheaves 50. The sheaves 51 are located to lie in a plane substantially parallel to the plane of the two arms 39 of the yoke boom 31.

At the upper end of the tail gate 52 of the dump truck I mount a relatively broad roller 53 in alignment with the sheave 35.

On the center of the framework 25 I mount a derrick structure 54, suitably fabricated from angle stock and carrying a head 55. Upon the head 55 I mount two sheaves 56 which are mounted obliquely so as to receive a cable 57 which extends from the sheaves 56 to the sheaves 35 and sometimes in engagement with the sheave 53. The cable 57 is guided by the sheaves 56 so that it may pass freely in a downward and outward direction to sheaves 58 which are carried by blocks 59. The blocks 59 are pivotally mounted on the extremities of the frame 25, and the sheaves 58 guide the cable 57 downwardly through a cable guide 60 adjacent each wheel 21 on to a drum 61 carried by each wheel 21 in a manner hereinafter to be described. It will readily be understood that when the truck is moved forwardly, the drums 61 are rotated in clockwise direction and the cable 57 is wound around the drums. Consequently, the boom 31 is swung upwardly and the buckets 36 are carried thereby from their ground engaging loading position into a position above the body 20. If the forward movement of the truck is continued sufficiently, the boom 31 would engage the derrick structure. In the normal use of the loader, the boom is arrested by stopping the truck at the suitable loading position. When the truck is moved in the opposite direction, the cable 57 is unwound from the drums 61 and the buckets 36 are carried downwardly into the ground engaging position. Continued rearward movement of the truck forces the buckets 36 into the snow or other material to be loaded, and after they are loaded, the truck is moved forwardly so as to carry the new load above the truck body 20.

The derrick structure 54 includes a guide mast 62, which may suitably be a channel, located preferably on the front side of the structure. A counterpoise 63 is arranged to slide up and down on the guide mast 62. A cable 64 is secured to the counterpoise 63 and passes over a sheave 65 mounted on the upper end of the derrick structure. The other end of the cable 64 is connected to a floating block 66, which includes two or more sheaves 67. It will readily be understood that as the counterpoise 63 moves downwardly, the block 66 moves upwardly. At the base of the derrick structure are mounted three sheaves 68 in operative alignment with the sheaves 67. A cable 69 is connected to one of the drums 61, for example the right-hand drum, extends through the cable guide 60 over a sheave 70 mounted on a block 71 which is located at the adjacent end of the frame 25, under one of the sheaves 68, over one of the sheaves 67, under a second of the sheaves 68, over the other sheave 67, under the other sheave 68, around a sheave 72 carried by a block 73 pivotally mounted on the other end of the frame 25 around the left-hand sheave 51, around the sheave 50 of the right-hand bucket, around the sheave 50 of the left-hand bucket, around the right-hand sheave 51, around a sheave 74 carried by a block 75 pivotally mounted on the right-hand side of the frame 25, around a similar sheave 76 carried by a block 77 pivotally mounted on the left-hand side of the frame 25, and back to the left-hand drum 61.

The counterpoise 63 maintains the cable 69 taut. Furthermore, the weight of the counterpoise 63 is not sufficient to overcome the tension of the springs 49. Means hereinafter to be described are provided for causing increased tension in the cable 69 at the proper time to effect the movement of the buckets 36 towards each other with sufficient force to unlatch the gate.

The channel member 62 has its open side directed forwardly, and the counterpoise 63 is provided with a vertical rib 78 which rides freely within the channel. A bar 79 is mounted on the counterpoise 63 so as to engage the rear face of the channel 62. One side of the bar 79 is anchored to the counterpoise 63 by a bolt 80. The other end of the bar 79 is adjustably secured to the counterpoise 63 by means of a bolt 81 which is held against rotation in the bar 79 and extends freely through the counterpoise. The bolt 81 carries on its forward side a nut 82 which carries two arms 83 and 84. The arm 83 is connected by a tension spring 85 to an abutment on the counterpoise and is arranged to rotate the nut 82 into normal position where the arm 83 engages the stop 86. The bolt 81 has a left-hand thread and the arrangement is such that when the spring 85 brings the arm 83 into engagement with the stop 86, the bar 70 is free with relation to the channel 64 and the counterpoise may move freely up and down. The arm 84 has connected thereto a lanyard or pull cord 87 so arranged that a downward pull on the cord tightens the nut 82 on the bolt 81 with the result that the bar 70 is forced against the rear face of the channel 64. Consequently, while the pull on the lanyard 87 is maintained, the counterpoise 63 may be held against movement.

The general operation of the structure thus far described is as follows:

The truck is backed towards the material, such as snow, which is to be loaded. The cables 57 and 69 unwind from the drums 61 with the result that the boom descends to bring the buckets towards the ground. At the same time the cable 60 is being paid out from the drum, the counterpoise 63 descends so as to keep the cable 69 taut. During the descent of the boom 31, the gates 44 close, the lower ends of the latches 45 being beveled to permit automatic closing and latching of the gates.

It may be noted that the springs 49 are sufficiently powerful to effect the projection of the latches 45 when the opening pull of the cable 69 is terminated. Continued rearward movement of the truck after the buckets reach the ground collects a load of snow or other material in the buckets, this collection being from an area back of the truck and between the wheels of the truck.

After the buckets have collected their loads, the truck is moved forwardly and the boom 31 is elevated owing to the winding of the cable 57 on the drums 61. At the same time the cable 69 is wound upon the drums 61 and the counterpoise 63 moves upwardly. When the buckets have arrived at a suitable position above the body 20, an operator pulls the lanyard 87 so that the counterpoise can no longer move upwardly.

Consequently, the sheave 67 becomes stationary and the continuing winding up of the cable 69 on the drums 61 applies considerable tension to this cable with the result that the two pulleys 50 are drawn together with sufficient force to overcome the tension of the springs 49, with the result that the gates 44 open. These gates being in the general position shown in dot-and-dash lines in Fig. 1, the load drops out of the buckets into body 20.

If the load tends to adhere to the buckets, for example in the case of wet snow, the opening of the gates brings the inner curved end thereof, shown in dotted lines in Fig. 1, into the load so that the load receives a starting kick from the opening of the gates. The operation may be continued indefinitely, the truck being moved forwardly and rearwardly.

When the loader is employed for the purpose of loading snow, the buckets 36 are moved outwardly into their positions in Fig. 2 during each alternate operation. The separation of the buckets 36 is effected manually by an operator. The separation of the buckets causes the counterpoise 63 to move upwardly. When operated in this manner, it will be apparent that the snow is alternately collected from the areas immediately behind the wheels of the truck and from the areas behind the center of the truck and in this way the truck cleans its own path for the snow-removing operation.

When the buckets are separated by hand, as described above, and the truck is moved forwardly, the weight of the counterpoise 63 is not sufficient to overcome the resistance of the latches 38 and 39 so that during the upward movement of the boom 31, the buckets 36 remain in their separated positions on the transverse framework 32 as the cable 69 is wound upon the drums 61. When the operator pulls the lanyard 87, the tension of the cable 69 increases so that the buckets are drawn towards each other. In their final approaching movement the bars 48 are actuated and the gates 44 are opened so that the loads are dumped from the buckets into the body 20.

The drums 61 are mounted upon and beyond the rear wheels 21 of the truck which are connected together by the conventional differential. The left-hand drum is shown in Figs. 6 and 7 and it is to be understood that the right-hand drum is precisely similar with the exception that the pawl and ratchet are reversed. In the assembly the two pawls are in alignment and both ratchets have their teeth directed in the counter-clockwise direction as viewed from the left.

I secure upon the wheel 21 a flange cylinder 88 to which I bolt the flange cylinder 89. Integrally secured to the cylinder 89, for example by welding, is a disc 90 which carries at its center a stub axle 91 located in alignment with the wheel axle. The stub axle 91 rotatably carries the hub 92 of the drums 61. The drum 61 comprises a peripheral channel 93 which is connected by an annular web 94 to a cylindrical housing 95 which is located around the disc 90 and in free relation thereto. A disc 96, welded or otherwise secured to the cylindrical housing 95, is bolted to the hub 92.

An annular member 97 of Z-shaped cross-section is bolted to the outer side of the disc 96. The ratchet wheel 98 is in the form of an annulus having ratchet teeth around its periphery. The ratchet wheel 98 is provided with a boss 99 which is normally located within the opening provided by the annulus 97. An annulus 100 located within the annulus 97 is connected to the ratchet wheel by bolts 101 which can be adjusted by means of a tool inserted through openings 102 in the disc 96.

The ratchet wheel 98 and the annulus 100 are separated from the intermediate flange of the annulus 97 by means of friction rings 103. The ratchet wheel normally rotates with the vehicle wheel but on overload the ratchet wheel may slip relatively to the wheel of the vehicle. The load point at which slippage occurs can be controlled by adjustment of the bolts 101.

The dog 104 which cooperates with the ratchet wheel 98 is pivotally mounted on a pin 105 which projects inwardly from the disc 96. The dog is normally forced against the ratchet teeth by means of a leaf spring 106 which is secured to the dog. The hub of the dog 104 is arranged for free sliding movement on the pin 105 so that it may be manually displaced into inoperative position when desired.

The dog 104 has a handle 107 which projects through an opening in the housing 95 and through an opening in a plate 108 secured to the housing. The web 94 is interrupted at 109 to accommodate the handle 107 and the plate 108.

As shown in Fig. 7—A, the plate 108 has an axial slot 109 provided at its ends with extensions 110, 111. When the dog 104 is in engagement with the ratchet wheel 98, the handle 107 is located in the slot extension 110. When it is desired to keep the dog 104 inoperative, the handle 107 is moved to the left as viewed in Fig. 6 to bring it into alignment with the main portion of the slot 109 and the handle is moved inwardly so that the spring 106 may locate the handle 107 in the inner slot extension 111. In this position the dog 104 is out of engagement with the ratchet wheel 98.

The bolts which secure the disc 96 to the hub 92 serve also to secure to these elements a hub cap 112 provided with a trunnion 113. Upon the trunnion 113 I mount, with the aid of a suitable keeper, the bifurcated end 114 of a cable guide arm 115. The cable guide arm 115 extends radially along the outer side of the drum and at its outer end carries a loop 116 which is in alignment with the channel 93 of the drum.

The cables 57 and 69 extend through the loop 116. The ends of these cables pass through an opening 117 in the bottom of the channel 93 and they are secured together and to the drum by means of a clamping member 118. The opening 117 and the clamping member 118 are located within an opening 119 in the web 94.

I prefer to provide a cable guide stop 120. This stop is pivotally mounted on an anchor bracket 121 which is mounted on the outer side of the web 94. In normal use the stop 120 is located within the bracket 121 and against the web 94. When the stop is to be used, it is swung outwardly about its pivot as shown in Fig. 9 so as to bring the recess 122 into the path of the arm 115.

In the normal operation, the dogs 104 are in engagement with their ratchets 98 as shown in Fig. 6. When the truck is moved forwardly, the ratchets 98 are rotated in counter-clockwise direction as viewed in Fig. 6 and the cables 57 and 69 are wound up on the drum so that the boom is elevated in the manner previously described.

During the latter part of the forward movement of the vehicle, the lanyard 87 is pulled and the increase of tension resulting from the continuing wind-up of the cable 69 overcomes the tension of the springs 49 so that the gates open to dump the load. The forward movement of the vehicle is now arrested, but in case the vehicle moves forward so as to bring the boom structure into engagement with the derrick structure, the slippage clutch provided by the elements 98, 102, 97, 103, 100, allows the ratchet wheels 98 to remain stationary.

Reverse movement of the vehicle rotates the ratchet wheels 98 in clockwise direction as viewed in Fig. 6 and the drums 61 rotate in clockwise direction under the influence of the weight of the boom so that for the initial part of the rearward movement of the vehicle the dogs 104 follow the ratchets. When the buckets reach the ground, the drums 61 cease to rotate and the ratchets 98 slip in counterclockwise direction past the dogs 104 during the period in which the buckets collect a load.

It is to be noted that in the event that one or both wheels is located on ice and tends to spin, owing to the low friction between the wheel and the ice, the load nevertheless can be hoisted up above the truck body since the drum will be driven by the spinning wheel or wheels. If only one of the wheels spins, the load will be elevated by the winding up of the cables on the drum carried by the spinning wheel. However, it is preferred to make use of the boom and its load to prevent the wheel from spinning and to move the truck onto better footing. This can be done by disengaging the dog 104 on the non-spinning wheel, the load being on the ground. If the driver now tries to move the truck forward, the spinning of the wheel with poor footing is prevented by the load on the boom and usually the wheel, on good footing, gets enough drive power to move the vehicle forwardly.

If, nevertheless, the spinning wheel continues to spin, it will itself hoist the boom to the top of the mast at which point the cable pull will immediately increase to the limit determined by the slip clutch of the winding drum. The slip clutches are normally set at about thirty percent of full rear axle torque in each drum or a total of approximately sixty per cent for the axle. Thus the truck differential is substantially locked when the buckets reach the end of their travel and the forward movement of the vehicle by means of the drive applied to the non-spinning wheel is practically insured.

When it is desired to convey the load to the dumping location, the buckets are hoisted several feet beyond transit position and the stops 120 are moved out into their positions shown in Fig. 9. The truck is then backed up until the recesses 122 receive the cable guide arms 115. This engagement locks the drum against unreeling and relieves the pressure on the dogs 104 so that they can be manually disengaged from the ratchets 98 and moved into the inoperative position shown in dotted lines in Fig. 7. After both dogs are disconnected, the truck is free to move in any direction without affecting the loading mechanism.

In some cases, owing to slippage of one wheel, all the cable may be wound up on one drum. In this case the truck would need to back twice as far to lower the bucket as it would if each drum had half the wound-up cable. If it is not convenient to move the truck back so far, the condition may be remedied by moving out the stop 120 associated with the drum containing the cable, back up a relatively short distance until the cables lead radially from the drums, disconnect the dogs 104, and move the truck forward to some place where sufficient backing space is available.

When the buckets are in elevated or transit position, as shown in dot-and-dash lines in Fig. 1, the body may be dumped in the usual manner by means of the conventional hydraulic hoist (not shown). As previously explained, the application of pressure fluid to the hoist, opens the hooks 23 so that the body may swing about its pivots 22 to dump the load.

If the weight of the boom and buckets overbalances the body in dumping position so that the body will not fall by gravity, the truck may be moved forwardly with one or both dogs engaged, and the pull on the cables by the drums will pull the body down. In some cases the boom will be carried up into engagement with the mast or derrick. It is to be understood that the plates 40 extend forwardly, that is, toward the axis defined by the trunnions 29, so that they engage the head 55 of the derrick structure in front of the sheaves 56. Continued pull on the cables 57 and 69 starts the body downwardly so that it assumes normal latched position. By backing up a few feet, the boom is returned to its transit position, the stop 120 being first projected into the position shown in Fig. 9. The dogs are then moved into inoperative position and the truck is in condition to return to the loading location.

The derrick structure 54 may be mounted upon the transverse frame 25 so that the structure can be swung around rearwardly into substantially horizontal position when it is desired to house the truck in a garage. Thus, the derrick structure 54 may be built upon a base 123 which is pivoted to the frame 25 adjacent its rear end by means of pivots 124. The forward end of the base 123 may be removably bolted to the frame 25 as shown at 125. Before the derrick structure 54 is swung down into horizontal position, the boom 30 is elevated part way and it may be secured in position with the buckets clear of the ground by means of chains on the body 20.

While the dual-drum structure described above is particularly adapted for use where the footing is poor, as is frequently the case when the loader is employed for snow removal, still for purposes where the footing is better I may dispense with one drum and work from a single drum.

In Fig. 11 I show a reaving diagram for a modification employing a right-hand drum only. In this embodiment the hoisting cable 57' is fastened to the center of the frame 32 and it passes over a single sheave 56' at the top of the derrick around a sheave 58' mounted at the end of the frame 25, the other end of the cable 57' being secured to the right-hand drum 61'.

The bucket-unlatching cable 69' is also secured to the right-hand drum 61' and it passes around a sheave 70' on the right-hand side of the frame 25, around the three sheaves 68' and the two sheaves 67' around a sheave 72' at the left-hand end of the frame 25, around a sheave 51' at the left-hand end of the frame 32, around a sheave 50' on the right-hand bucket 36. The end of the cable 69' is fastened to the left-hand bucket 36.

The forward movement of the vehicle winds up both cables upon the drum 61', the cable 57' hoisting the yoke 30 up to a position where the buckets are over the body 20. The winding up of the cable 69' during the forward movement of the vehicle effects the drawing together of the buckets 36 and the opening of the gates in precisely the same manner as in the previously described embodiment of the invention. It is to be noted that since only one drum is employed, the movement of the vehicle has to be greater than in the previously described embodiment of the invention. Rearward movement of the vehicle pays out the cables from the drum 61' with the result that the boom is lowered to load collecting position and continued rearward movement for the collection of a load in the buckets is attended by the movement of the ratchet wheel 98 past the dog 104 as in the previously described embodiment of the invention.

Although the invention has been described in connection with specific details of preferred embodiments thereof, it must be understood that such details are not intended to be limitative of the invention except in so far as set forth in the accompanying claims.

I claim:

1. In a truck having two power driven wheels and a differential connecting them, the combination of a pair of drums mounted on said wheels, an overload slippage clutch and dog and ratchet means operatively connecting each drum to its associated wheel whereby each drum is positively driven only when the truck moves in one direction, and a cable operatively connected to both said drums.

2. In a truck having two power driven wheels and a differential connecting them, the combination of a pair of drums mounted on said wheels, a cable operatively connected to both said drums, a cable guide arm pivotally mounted adjacent the center of each drum and provided with a loop through which the cable passes, a movable abutment on said drum adapted to be located in or out of the path of said arm and arranged to engage said arm to prevent unwinding of the drum.

3. In a truck having two power driven wheels and a differential connecting them, the combination of a pair of drums mounted on said wheels, actuable means for operatively connecting and disconnecting said drums to and from their associated wheels, a cable operatively connected to both said drums, a cable guide arm pivotally mounted adjacent the center of each drum and provided with a loop through which the cable passes, a movable abutment on said drum adapted to be located in or out of the path of said arm and arranged to engage said arm to prevent unwinding of the drum.

4. In combination with a vehicle wheel, a drum rotatably mounted on said wheel, a cable operatively connected to said drum, means for operatively connecting and disconnecting said drum to and from said wheel, an arm pivotally mounted on said drum and having a loop or opening through which said cable passes, and adjustable means for preventing relative movement between said arm and drum.

5. A loader for trucks comprising a U shaped boom arranged to be pivotally mounted on a truck to swing between a loading position behind the truck and a dumping position above the truck, a load collecting bucket arranged to be moved transversely of the truck on said boom to collect load at a plurality of positions behind the truck, and drum means on a wheel of the truck arranged to move the boom upwardly on forward movement of the truck and to move said bucket along said boom towards the center of the truck.

6. A loader for trucks comprising a U shaped boom arranged to be pivotally mounted on a truck to swing between a loading position behind the truck and a dumping position above the truck, a load collecting bucket open at its rear end and having a gate at its forward end arranged to be moved transversely on said boom to collect load at a plurality of positions behind the truck as the truck moves rearwardly, drum means on a wheel of the truck arranged to move the boom upwardly on forward movement of the truck, to move said bucket towards the center of the truck and release said gate.

7. A loader for a truck comprising a U shaped boom pivotally mounted on said truck to swing between a position behind said truck and a dumping position above the truck, a pair of buckets arranged to be moved transversely of the truck on said boom, said buckets being open at their rear ends and provided with gates on their forward ends, latch means on each gate arranged to engage the other bucket when the buckets are forcibly moved close to each other, a drum on a wheel of the vehicle, cable means connected to said boom and said drum whereby the boom is elevated by forward movement of the truck and is allowed to descend on rearward movement of the truck, a second cable means connected to said buckets and said drum whereby the buckets are drawn towards each other and the gates are unlatched by forward movement of the truck.

8. A loader for a truck comprising a U shaped boom pivotally mounted on said truck to swing between a position behind said truck and a dumping position above the truck, a pair of buckets arranged to be moved transversely of the truck on said boom, said buckets being open at their rear ends and provided with gates on their forward ends, latch means on each gate arranged to engage the other bucket when the buckets are forcibly moved close to each other, a drum on a wheel of the vehicle, cable means connected to said boom and said drum whereby the boom is elevated by forward movement of the truck and is allowed to descend on rearward movement of the truck, a second cable means connected to said buckets and said drum, movable means for maintaining said second cable means taut, and means for impeding the movement of said movable means whereby tension is built up in said second cable means to draw the buckets together with sufficient force to unlatch the gates.

9. A loader for trucks comprising a boom arranged to be pivotally mounted on a truck, a drum, means for connecting and disconnecting the drum to and from the power unit of the truck, a cable connected to said boom and said drum whereby the boom can be raised by rotation of said drum, a cable guide arm pivotally mounted on said drum and having an opening through which said cable passes, and adjustable means for preventing relative movement between said arm and drum whereby the boom may be supported by said drum when the drum is disconnected from said power unit.

10. A loader for trucks comprising a U shaped boom arranged to be pivotally mounted on a truck to swing between a loading position behind the truck and a dumping position above the truck, a load collecting bucket arranged to be moved transversely of the truck on said boom to collect load at a plurality of positions behind the truck, and drum means associated with a wheel of the truck, adjustable means for connecting and disconnecting said drum to and from the power unit of the truck and arranged to move the boom upwardly when driven in one direction and to move said bucket along said boom towards the center of the truck.

11. A loader for trucks comprising a derrick arranged to be mounted on a truck, a U shaped boom arranged to be pivotally mounted on said truck to swing from a position behind the truck, to a position over the truck, a pair of buckets mounted on said boom for movement in the transverse direction of the truck, said buckets having their rear ends open whereby loads may be collected therein by rearward movement of the truck, a drum associated with a wheel of the truck and adapted to be driven in opposite directions by the motive unit of the truck, a cable connected to said drum and to said boom, and a sheave at an elevated position of said derrick around which the cable passes, whereby the boom may be elevated and allowed to descend.

12. A loader for trucks comprising a derrick arranged to be mounted on a truck, a U shaped boom arranged to be pivotally mounted on said truck to swing from a position behind the truck, to a position over the truck, a pair of buckets mounted on said boom for movement in the transverse direction of the truck, said buckets having their rear ends open whereby loads may be collected therein by rearward movement of the truck, a drum associated with a wheel of the truck and adapted to be driven in opposite directions by the motive unit of the truck, a cable connected to said drum and to said boom, a sheave at an elevated position of said derrick around which the cable passes, whereby the boom may be elevated and allowed to descend, and a cable connected to said drum and to said buckets adapted to draw said buckets together.

13. A loader for trucks comprising a derrick arranged to be mounted on a truck, a U shaped boom arranged to be pivotally mounted on said truck to swing from a position behind the truck to a position over the truck, a pair of buckets mounted on said boom for movement in the transverse direction of the truck, said buckets having their rear ends open whereby loads may be collected therein by rearward movement of the truck, said buckets having gates at their forward ends and latches adapted to be opened by forcible engagement with the other bucket, a drum associated with a wheel of the truck and adapted to be driven in opposite directions by the motive unit of the truck, a cable connected to said drum and to said boom, a sheave at an elevated position of said derrick around which the cable passes, whereby the boom may be elevated and allowed to descend, a cable connected to said drum and to said buckets adapted to draw said buckets together, movable weight means for keeping last said cable taut, and manually operable means for opposing the movement of said weight means to increase the tension of last said cable and effect unlatching of the gates.

14. A loader for trucks comprising a derrick arranged to be mounted on a truck, a U shaped boom arranged to be pivotally mounted on said truck to swing from a position behind the truck, to a position over the truck, a pair of buckets mounted on said boom for movement in the transverse direction of the truck, said buckets having their rear ends open whereby loads may be collected therein by rearward movement of the truck, a pair of drums associated with the rear wheels of the truck and adapted to be driven in opposite directions by the motive unit of the truck, a cable connected to both said drums and freely connected to said boom, and sheaves at an elevated position of said derrick around which said cable passes, whereby the boom may be elevated and allowed to descend.

15. A loader for trucks comprising a derrick arranged to be mounted on a truck, a U shaped boom arranged to be pivotally mounted on said truck to swing from a position behind the truck, to a position over the truck, a pair of buckets mounted on said boom for movement in the transverse direction of the truck, said buckets having their rear ends open whereby loads may be collected therein by rearward movement of the truck, a pair of drums associated with the rear wheels of the truck and adapted to be driven in opposite directions by the motive unit of the truck, a cable connected to both said drums and freely connected to said boom, sheaves at an elevated position of said derrick around which said cable passes, whereby the boom may be elevated and allowed to descend, and a cable connected to both said drums and to said buckets adapted to draw said buckets together.

16. A loader for trucks comprising a derrick arranged to be mounted on a truck, a U shaped boom arranged to be pivotally mounted on said truck to swing from a position behind the truck, to a position over the truck, a pair of buckets mounted on said boom for movement in the transverse direction of the truck, said buckets having their rear ends open whereby loads may be collected therein by rearward movement of the truck, said buckets having gates at their forward ends and latches adapted to be opened by forcible engagement with the other bucket, a pair of drums associated with the rear wheels of the truck and adapted to be driven in opposite directions by the motive unit of the truck, a cable connected to both said drums and freely connected to said boom, sheaves at an elevated position of said derrick around which said cable passes, whereby the boom may be elevated and allowed to descend, a cable connected to both said drums and to said buckets adapted to draw said buckets together, movable weight means for keeping last said cable taut, and manually operable means for opposing the movement of said weight means to increase the tension of last said cable and effect unlatching of the gates.

17. A loader for trucks comprising a derrick arranged to be mounted on a truck, a U shaped boom arranged to be pivotally mounted on said truck to swing from a position behind the truck, to a position over the truck, a pair of buckets mounted on said boom for movement in the transverse direction of the truck, said buckets having their rear ends open whereby loads may be collected therein by rearward movement of the truck, a pair of drums associated with the rear wheels of the truck and adapted to be positively driven by said wheels during forward movement of the truck and being arranged to remain stationary when the truck moves in the rearward direction when the buckets are on the ground, a cable connected to both said drums and freely connected to said boom, and sheaves at an elevated position of said derrick around which said cable passes, whereby the boom may be elevated and caused to descend by forward and rearward movements of the truck.

18. A loader for trucks comprising a derrick arranged to be mounted on a truck, a U shaped boom arranged to be pivotally mounted on said truck to swing from a position behind the truck, to a position over the truck, a pair of buckets mounted on said boom for movement in the transverse direction of the truck, said buckets having their rear ends open whereby loads may be collected therein by rearward movement of the truck, a pair of drums associated with the rear wheels of the truck and adapted to be positively driven by said wheels during forward movement of the truck and being arranged to remain stationary when the truck moves in the rearward direction when the buckets are on the ground, a cable connected to both said drums and freely connected to said boom, sheaves at an elevated position of said derrick around which said cable passes, whereby the boom may be elevated and caused to descend by forward and rearward movements of the truck, and a cable connected to both said drums and to said buckets adapted to draw said buckets together.

19. A loader for trucks comprising a derrick arranged to be mounted on a truck, a U shaped boom arranged to be pivotally mounted on said truck to swing from a position behind the truck to a position over the truck, a pair of buckets mounted on said boom for movement in the transverse direction of the truck, said buckets having their rear ends open whereby loads may be collected therein by rearward movement of the truck, said buckets having gates at their forward ends and latches adapted to be opened by forcible engagement with the other bucket, a pair of drums associated with the rear wheels of the truck and adapted to be positively driven by said wheels during forward movement of the truck and being arranged to remain stationary when the truck moves in the rearward direction when the buckets are on the ground, a cable connected to both said drums and freely connected to said boom, and sheaves at an elevated position of said derrick upon which said cable passes whereby the boom may be elevated and caused to descend by forward and rearward movements of the truck, a second cable connected to both said drums and to said buckets adapted to draw said buckets together, movable weight means for keeping last said cable taut, and manually operable means for opposing the movement of said weight means to increase the tension of last said cable and effect unlatching of the gates.

20. A loader for a truck comprising a pivotally mounted boom, a pair of drums, a differential connecting said drums, a cable freely connected to said boom and operatively connected to said drums, and power means connected to said differential to operate said drums.

21. A loader for a truck having a pair of driven wheels and a differential connecting them comprising a boom pivotally mounted on the truck, a pair of drums operatively associated with said wheels, and a cable operatively connected to said drums and freely connected to said boom.

22. A loader for a truck comprising a pivotally mounted boom, a load carrying bucket carried by said boom and movable therewith, a pair of drums, a differential connecting said drums, a cable freely connected to said boom and operatively connected to said drums, and power means connected to said differential to operate said drums.

23. In a loader for trucks, the combination comprising a bucket having a gate supported on the bucket for swinging movement to open and closed positions, latch means for holding the gate in the closed position, drum means on a wheel of the truck, means including a cable operably connected to said drum for winding thereon to actuate the bucket between loading and unloading positions in which the gate is biased by gravity to swing to said closed and open positions respectively, and means actuated upon movement of the bucket to a selected position for effecting release of said latch means.

24. In a loader for trucks, the combination comprising a bucket having a gate supported on the bucket for swinging movement to open and closed positions, latch means for holding the gate in the closed position, drum means on a wheel of the truck, means including a cable operably connected to said drum for winding thereon to actuate the bucket between loading and unloading positions in which the gate is biased by gravity to swing to said closed and open positions respectively, means actuated upon movement of the bucket to a selected position for effecting release of said latch means, and means for manually effecting control of said selected position for the opening of said gate.

25. In a loader for a truck having a pair of drive wheels and a differential connecting said wheels, the combination comprising a boom adapted to be supported upon the truck for vertical swinging movement, a sheave on said boom, a derrick structure having a pair of sheaves thereon, a pair of drums adapted to be mounted on said wheels and driven thereby, and a cable threaded on said sheaves and connected at its ends to said drums to be wound on the drums for raising the boom.

ROBERT C. SHOEMAKER.